US010909256B1

(12) United States Patent
Fritz et al.

(10) Patent No.: US 10,909,256 B1
(45) Date of Patent: *Feb. 2, 2021

(54) CORRECTING ACCESS RIGHTS OF FILES IN ELECTRONIC COMMUNICATIONS

(71) Applicant: Google LLC, Mountain View, CA (US)

(72) Inventors: Victoria Hsiao-tsung Chou Fritz, Maplewood, NJ (US); Jeff Scott Harris, New York, NY (US); Sarah Shuilen Wu, New York, NY (US); Phillip Sharp, Sunnyvale, CA (US); Steven Joseph Saviano, Brooklyn, NY (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,624

(22) Filed: Jul. 16, 2018

Related U.S. Application Data (60) Continuation of application No. 15/148,013, filed on May 6, 2016, now Pat. No. 10,025,948, which is a
(Continued)

(51) Int. Cl.
*G06F 21/62* (2013.01)
*G06F 21/50* (2013.01)
(Continued)

(52) U.S. Cl.
CPC ........ *G06F 21/6218* (2013.01); *G06F 3/0481* (2013.01); *G06F 3/04842* (2013.01);
(Continued)

(58) Field of Classification Search
USPC ....................................................... 709/206
See application file for complete search history.

(56) References Cited

U.S. PATENT DOCUMENTS

| 5,748,896 A | * | 5/1998 | Daly | H04L 41/046 |
| | | | | 709/223 |
| 6,839,741 B1 | * | 1/2005 | Tsai | G06Q 10/10 |
| | | | | 707/999.009 |
| 7,647,460 B1 | * | 1/2010 | Wilson | G06F 11/2071 |
| | | | | 711/162 |
| 2002/0194147 A1 | * | 12/2002 | Ricke | G06N 5/00 |
| | | | | 706/53 |

(Continued)

OTHER PUBLICATIONS

RowdyBullGaming, "Proble Enabling WinRm on XP SP3," Jan. 2012, RowdybullGamining,mirosoft.com http://social.technet.microsoft.com/Forums/windownsserver/en-US/b9c3c6d3-e546-43aa-9d2e-897a823868dd/problem-enabling-winrm-o-xp-sp3?forum=winserverpowershell.

*Primary Examiner* — Ruolei Zong
(74) *Attorney, Agent, or Firm* — Lowenstein Sandler LLP (57) ABSTRACT

A method and system is disclosed that provides a drafting area of a user interface for a sender to compose an electronic communication and a field area of the user interface to receive user input that identifies a recipient of the electronic communication. The method and system receive a user input of a resource locator of a file in the user interface. Responsive to receiving the user input of the resource locator of the file in the user interface, the method and system present, in the user interface, a notification area that identifies, for the sender, a plurality of options to modify access rights of the recipient to the file identified in the electronic communication, wherein the access rights of the recipient are allowed to be modified by the sender who is not an administrator or an owner of an access control list associated with the file.

20 Claims, 7 Drawing Sheets

Related U.S. Application Data division of application No. 13/616,695, filed on Sep. 14, 2012, now Pat. No. 9,361,473.

(51) Int. Cl.
    *G06F 3/048*     (2013.01)
    *H04L 12/58*     (2006.01)
    *G06F 3/0484*     (2013.01)
    *G06F 3/0481*     (2013.01)
    *H04L 29/06*     (2006.01)

(52) U.S. Cl.
    CPC .......... *G06F 21/50* (2013.01); *G06F 21/6209* (2013.01); *H04L 51/08* (2013.01); *H04L 63/04* (2013.01); *G06F 2221/031* (2013.01); *G06F 2221/2141* (2013.01)

(56) References Cited

U.S. PATENT DOCUMENTS

| | | | |
|---|---|---|---|
| 2003/0110169 A1* | 6/2003 | Zuili | C12N 9/16 |
| 2006/0015579 A1* | 1/2006 | Sastri | H04W 84/00 |
| | | | 709/219 |
| 2006/0173999 A1* | 8/2006 | Rider | H04L 63/10 |
| | | | 709/225 |
| 2008/0147679 A1 | 6/2008 | Kelley et al. | |
| 2010/0099380 A1 | 4/2010 | Chen | |
| 2011/0119771 A1* | 5/2011 | Postoyko | G06F 21/6209 |
| | | | 726/28 |
| 2011/0258234 A1 | 10/2011 | Dawson et al. | |
| 2012/0151379 A1* | 6/2012 | Schultz | H04L 51/08 |
| | | | 715/752 |
| 2013/0275765 A1* | 10/2013 | Lay | H04L 9/3239 |
| | | | 713/189 |

\* cited by examiner

CORRECTING ACCESS RIGHTS OF FILES IN ELECTRONIC COMMUNICATIONS

RELATED APPLICATIONS

This application is a continuation application of U.S. patent application Ser. No. 15/148,013, filed on May 6, 2016, which is a divisional of U.S. patent application Ser. No. 13/616,695, filed Sep. 14, 2012, issued as U.S. Pat. No. 9,361,473, on Jun. 7, 2016, the entire content of both are hereby incorporated by reference herein.

BACKGROUND

Electronic communications, such as e-mail, are a convenient method of distributing electronic documents and files. Traditionally, a copy of the file is attached to an e-mail and sent to each recipient. Since copies of the file are distributed to each recipient, who can then recopy or retransmit the file, the sender has no control over the file once it has been sent. In addition, because each file has a memory size, transmission of large files or numerous files consume large amounts of bandwidth. Recently, online data storage services, or cloud storage services, allow users to store files on a remote network These cloud storage services may also provide a related e-mail service that allows users to send files stored in the remote network Instead of attaching a file to the e-mail, a sender can insert a unifoml resource locator (URL) link into the e-mail, where the link represents the location of the file on the remote network. When recipients click on the link, a web browser window is used to display or download the file. In this manner, files can be exchanged via e-mail without having to create copies of the file.

Cloud storage services may provide users with access control over files stored in the cloud storage service. For example, users may specify that only certain people may access the file, or that people from a certain domain (e.g. somedomain.com) may access the file, or may specify that the general public can access the file. In addition, the user may specify certain levels of access for each authorized individual, e.g. whether the person can read the file only, or can write to the file, or can change the access controls. These rights to files are called access rights. One way of providing access control for a file is to use an access control list (ACL) associated with the file. For example, the ACL may be stored in a file's metadata. The ACL contains a list of individuals or groups authorized to access the file, and their corresponding level of access. The ACL may also contain lists of tokens or keys that, when presented by users, allows certain levels of access. Cloud storage services may provide ACLs or other access control methods for files stored in their network.

SUMMARY

Access rights problems may occur when a sender sends a link to a file stored in a cloud storage service via a URL link in an e-mail If the recipients do not have any access rights to the file, the recipients will not be able to open or view the file. Some services solve this problem by automatically granting the recipients access rights to the file or making the file publicly available. However, if the sender does not have the right to change the access rights of the file or file itself has restrictions on who can access it, then automatically changing the access rights in this fashion circumvents the access control system. In addition, the sender may not be aware of the fact that certain recipients do not have access rights to the file, and would not grant access if he or she were aware. Thus automatic granting of access rights may override the sender's intentions. Applicants have recognized that, there exists a need in the art to provide the sender with a variety of options to modify the access rights to a file, depending on the sender's access rights to the file.

An electronic communication service running on a client device, such as an e-mail service, allows senders to insert links to electronic files stored on a cloud storage service. However, not all recipients may have access rights to the file, and so the sender should be presented with options to modify the access rights to the file. When a sender inserts such a link representing a file into a draft electronic communication, the electronic communication service performs a check to determine whether the recipients can access the file. The electronic communication service may send information about the link, the sender, and the recipients to a server. The server determines the access rights of the sender and recipients, and also determines a number of options that the sender may use to modify the access rights to the file for each recipient. These options may include giving the recipients access rights to the document, or making the document public so that everyone with a link to the file can access it. The options are based on the access rights to the file. For example, if the sender does not have authorization to change the access rights to the file, the sender cannot modify the recipients' access rights. In another example, the file itself may have limitations on how it can be shared. The server sends the options to the client device and the electronic communication service displays the options to the sender. The client device may determine additional options for modifying the access rights to the file and display them as well. The sender may select one of the options or may send the communication without selecting any options. This gives the sender the opportunity to fix any access rights problems for the recipients, or at least makes the sender aware of the problems.

One aspect described herein discloses a method for modifying access rights to electronically stored files linked in a draft electronic communication stored at a client device. The method includes receiving, at a server from the client device, information relating to a plurality of recipients of the draft electronic communication, information relating to a sender of the draft electronic communication, and a first link, where the first link represents a first file. The method further includes determining, at the server, for the sender and for each recipient in the plurality of recipients, the access rights to the first file. The method further includes generating, at the server, a plurality of options for the sender to modify the access rights for the plurality of recipients, where the plurality of options is based on the access rights to the first file, and sending the plurality of options from the server to the client device.

The information relating to the plurality of recipients may include each recipient's email address, and the information relating to the sender may include the sender's e-mail address. The first file may have an access control list and determining access rights includes searching the access control list for the sender and the plurality of recipients. The access rights of the first file may include the sender's access rights to the first file, each recipient's access rights to the first file, or a visibility of the first file. The plurality of options may include changing the visibility of the first file or adding the plurality of recipients to an access control list. The first file may be stored on the server.

Another aspect described herein discloses a method for modifying access rights to electronically stored files linked in a draft electronic communication stored at a client device. The method includes detecting, at the client device, the insertion of a first link into the draft electronic communication, where the first link represents a first file. The method further includes sending, from the client device to a server, information relating to a plurality of recipients of the draft electronic communication, information relating to a sender of the draft electronic communication, and the first link. The method further includes receiving, at the client device from the server, a plurality of options for modifying the access rights of the plurality of recipients to the first file, where the plurality of options is based on the access rights to the first file. The method further includes displaying the plurality of options to the sender before the draft electronic communication is sent.

The information relating to the plurality of recipients may include each recipient's email address, and the information relating to the sender may include the sender's e-mail address. The access rights of the first file may include the sender's access rights to the first file, each recipient's access rights to the first file, or a visibility of the first file. The plurality of options may include changing the visibility of the first file or adding the plurality of recipients to an access control list. The first file may be stored on the server. The client device may determine an additional plurality of options for modifying the access rights of the plurality of recipients to the first file. Displaying the plurality of options may include showing a notification window on the client device that displays the plurality of options.

The method may further include detecting, at the client device, the insertion of a second link into the draft electronic communication, where the second link represents a second file. The method then includes sending, from the client device to a server, information relating to the plurality of recipients, information relating to the sender, the first link, and the second link; receiving, at the client device from the server, a revised plurality of options tor modifying the access rights of the plurality of recipients to the first file and the second file, wherein the revised plurality of options is based on the access rights to the first file and the second file; and displaying the revised plurality of options to the sender before the draft electronic communication is sent.

The displaying may be performed when the sender attempts to send the draft electronic communication. The detecting, sending, and receiving is then performed when the sender adds an additional recipient to the plurality of recipients or when the sender removes a recipient form the plurality of recipients.

Another aspect described herein discloses a system for modifying access rights to electronically stored files linked in a draft electronic communication. The system includes a communication connection connecting a client device to a server. The server is configured to receive, from the client device through the communication connection, information relating to a plurality of recipients of the draft electronic communication, information relating to a sender of the draft electronic communication, and a first link, wherein the first link represents a first file. The server is further configured to determine, for the sender and for each recipient in the plurality of recipients, the access rights to the first file, and generate a plurality of options for the sender to modify the access rights for the plurality of recipients, where the plurality of options is based on the access rights to the first file. The server is further configured to send the plurality of options from the server to the client computer through the communication connection.

The first file may have an access control list and determining access rights includes searching the access control list for the sender and the plurality of recipients. The access rights of the first file may include the sender's access rights to the first file, each recipient's access rights to the first file, or a visibility of the first file. The plurality of options may include changing the visibility of the first file or adding the plurality of recipients to an access control list. The first file may be stored on the server.

Another aspect described herein discloses a user interface for modifying access rights to electronically stored files linked in a draft electronic communication stored at a client computer. The user interface includes a drafting window for a sender to compose the draft electronic communication to a plurality of recipients, where the drafting window allows the sender to insert a plurality of links and wherein the plurality of links represents a plurality of files stored on a server. The user interface further includes a notification window for presenting the sender with a plurality of options for modifying the access rights of the plurality of recipients to the plurality of files, where the plurality of options is based on the access rights to the plurality of files. The user interface further includes a selection area within the notification window for the sender to choose a first option from the plurality of options, and a warning area within the notification window for notifying the sender when the plurality of recipients do not have full access rights to the plurality of documents.

The warning area may also notify the sender when the sender's ability to modify the access rights to at least one file in the plurality of files is limited.

BRIEF DESCRIPTION OF THE FIGURES

The methods and systems may be better understood from the following illustrative description with reference to the following drawings in which.

DETAILED DESCRIPTION

To provide an overall understanding of the systems and methods described herein, certain illustrative embodiments will now be described, including systems and methods for modifying access rights to electronically stored files linked in a draft electronic communication. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope thereof. In particular, a server as used in this description may be a single computing device or multiple computing devices working collectively and in which the storage of data and the execution of functions are spread out amongst the various computing devices.

Aspects of the systems and methods described herein allow users to modify access rights to electronically stored files linked in a draft electronic communication. A sender uses an electronic communication service to draft an electronic communication, such as an e-mail or instant message, on a client device. The sender inserts a link within the draft electronic communication, where the link represents a file stored on a remote network, such as a cloud storage service. The electronic communication service sends information about the link, the sender, and the recipients to a server. The server uses the information to determine the access rights of the sender and each recipient to the file represented by the link. If one or more recipients do not have access rights to the file, the server generates a number of options for the sender to modify the access rights for those recipients. The options are based on the access rights to the file, which may include the sender's access rights to the file, the recipients' access rights to the file, and restrictions on which domains the file can be shared. The options are sent from the server to the electronic communication service on the client device and presented to the sender. The client device may also generate additional options to modify the access rights of the file and present them to the sender. In this manner, a sender of an electronic communication may control and modify access rights to files linked within the electronic communication.

Figure 1:
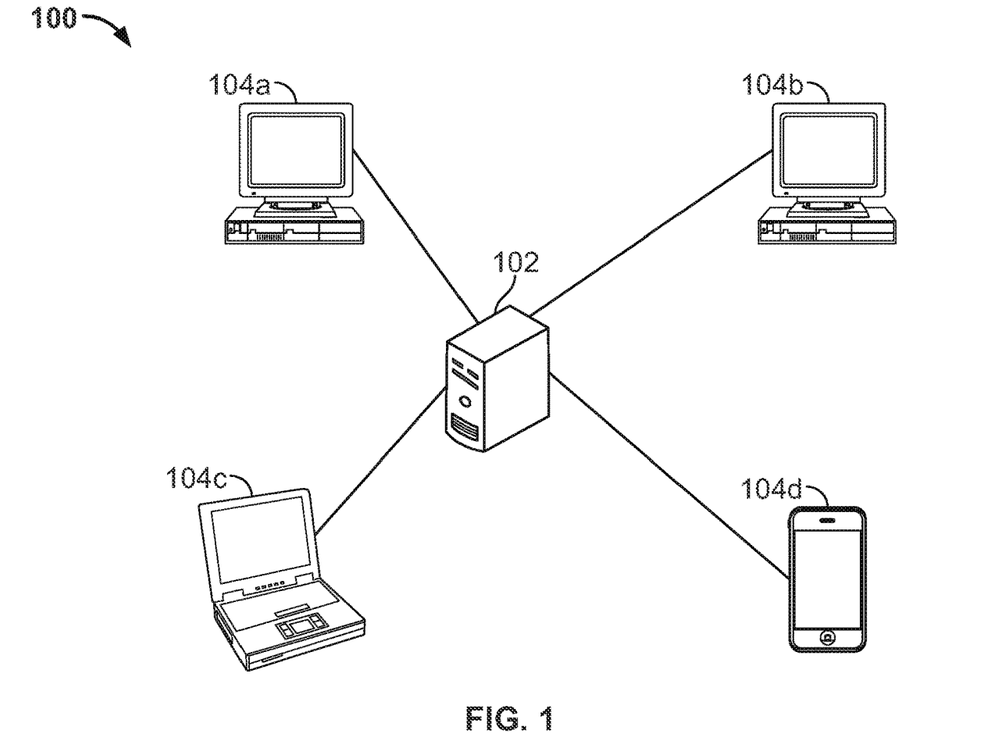
FIG. 1 shows a client-server system for sending electronic communications including links to electronically stored files in accordance with an implementation as described herein.

Electronic communication services provided over a network are usually implemented in a client-server system. For example, a user on a client device uses a web browser to connect to an electronic communication service provided by a server. The web browser displays a user interface for reading and writing electronic communications, such as e-mail, instant messaging, chat room, or any other form of electronic communication. Electronic communications may also be drafted using other tools, such as a text message service or an e-mail application installed on a mobile device. The server stores copies of communications sent and received. The server is also responsible for providing network access to send and receive communications. A general client-server system 100 for supporting an electronic communication service is shown in FIG. 1. The system 100 includes server 102 and a number of client devices 104a through 104d. Client devices may be desktop computers such as devices 104a and 104b, laptop computers such as device 104c, handheld and portable computing devices such as device 104d, or any other type of electronic device. There may be additional client devices that connect to server 102. Client devices 104a through 104d may communicate with server 102 through a variety of means, such as through a local area network (LAN), wide area network (WAN), an Internet connection, or any other type of network connection. Server 102 may encompass one or more computing devices that collectively provide the electronic communication service. For example, server 102 may include a gateway server for monitoring connections with client devices 104a and 104d and additional servers for storing communications information.

Server 102 in FIG. 1 may also provide a remote data storage service, or cloud storage service. A cloud storage service provides data storage for documents and other files. Users may create files on the service or upload files to the service for storage and may edit, distribute, or download the files using the service. A file stored in a cloud storage service may be represented by a unique URL link. This link may be sent via an electronic communication to one or more recipients. The recipients can then access the file by clicking on the link. Server 102 may encompass one or more computing devices that collectively provide the cloud storage service. For example, server 102 may include a gateway server for monitoring connections with client devices 104a and 104d and additional servers for storing files and other information.

The cloud storage service may have an access control system for protecting access to files stored on the service. One example of an access control system is an access control list (ACL) that may be associated with each file. In certain embodiments, the ACL contains information regarding who has access to the file and their associated role. A role may be a level of access and may include among others, no access, read access, write access, and administrator or owner access. Access can be given to individuals and defined groups (e.g. individuals from the same domain). The file may also have a visibility, which determines whether the general public may access the file or only certain groups or domains (e.g. only users with an account from somedomain.com can access the file). An ACL may include a table that lists one or more identifiers for each permitted person or group (e.g. e-mail addresses) and an associated role, and the file's visibility. When a person attempts to access a file with an ACL, the server may determine the file's visibility and whether or not the person is within a group or domain that can access the file. The server may also determine if the person is included in the ACL, and if so what role the person has. If the person is not found in the ACL, the server denies access to the person. In certain embodiments, only individuals with certain roles (e.g. administrator or owner) may modify the access rights of the file. Other individuals may have limited access or no access to view the ACL. Access rights may be modified by adding or removing individuals or groups from the ACL, or by changing the visibility of the file to public or private.

Figure 2:
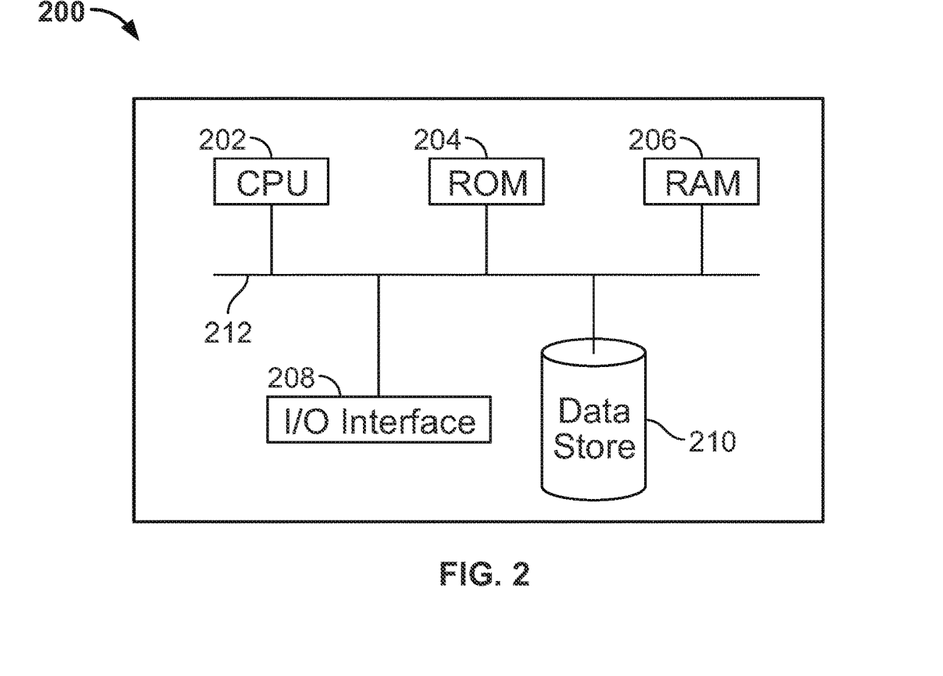
FIG. 2 shows a general server architecture for determining file access rights for linked files within electronic communications in accordance with an implementation as described herein.

The architecture of a typical server that provides electronic communication services and cloud storage services is now described. An example of such a server is shown in FIG. 2. Server 200 includes a central processing unit (CPU) 202, read only memory (ROM) 204, random access memory (RAM) 206, I/O interface 208, data store 210, and bus 212. Server computer 200 may have additional components that are not illustrated in FIG. 2. Bus 212 allows the various components of server 200 to communicate with each other. I/O interface 208 allows the server 200 to communicate with other devices, such as client devices or other servers. Data store 210 may store, among other things, information for providing an electronic communication service, such as user profiles and e-mail folders for specific users. Data store 210 may also store information for providing a cloud storage service, such as files associated with specific users. The provision of the electronic communications and cloud storage services is not limited to a single server as illustrated in FIG. 2. The services may be provided by multiple servers working collectively, and each server may have architecture similar to server 102.

Data store 210 for providing electronic communication and cloud storage services may be implemented using non-transitory computer-readable media. Examples of suitable non-transitory computer-readable media include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Figure 3A:
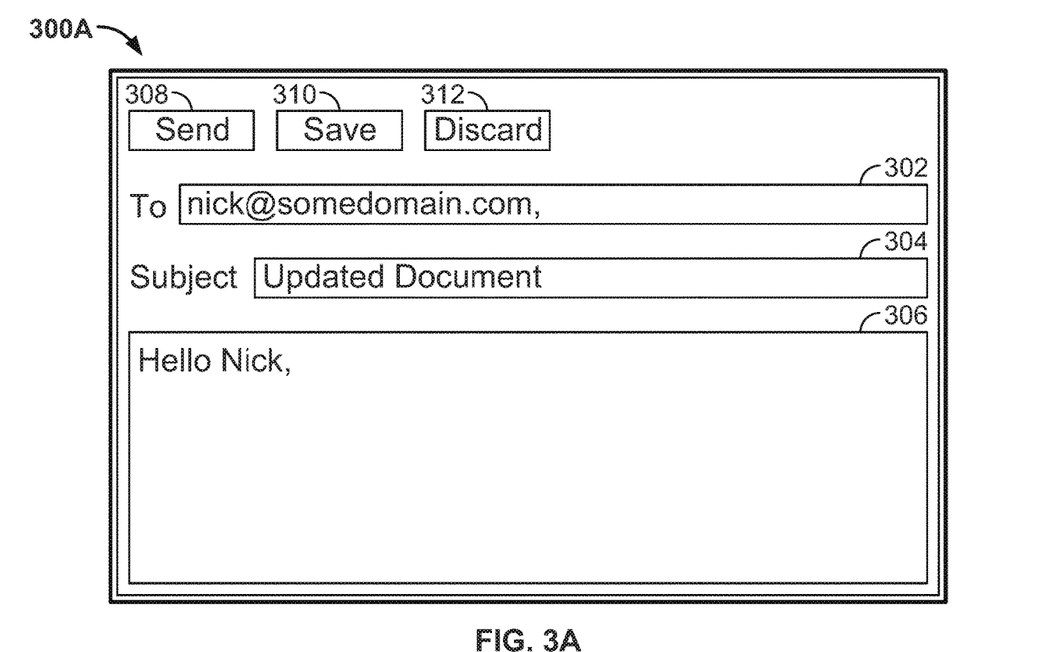
FIGS. 3A and 3B show sample user interfaces for drafting electronic communications in accordance with an implementation as described herein.

E-mail is an exemplary form of electronic communication. Electronic communication services provided by a server may include online e-mail services. A user navigates to the service home page using a web browser and logs in. The server provides a user interface to be displayed in the user's web browser, where the user can read, draft, and send e-mails. The server also stores the contents of the user's e-mail folders, such as the inbox, outbox, drafts, sent items, or deleted items. FIG. 3A shows a sample user interface for drafting an e-mail in an electronic communication service. User interface 300A includes a "To" field 302 where a sender enters in the e-mail addresses of the intended recipients, in this case a single recipient whose e-mail address is nick@somedomain.com. The interface also has a "Subject" field for entering the subject of the e-mail. The interface also contains a drafting window 306 for drafting the body of the e-mail. User interface 300A also includes one or more command options, such as the "Send" button 308 for sending the e-mail, "Save" button 310 for saving a draft of the e-mail, and "Discard" button 312 for deleting the draft e-mail. There may be other command options available to the sender.

Figure 3B:
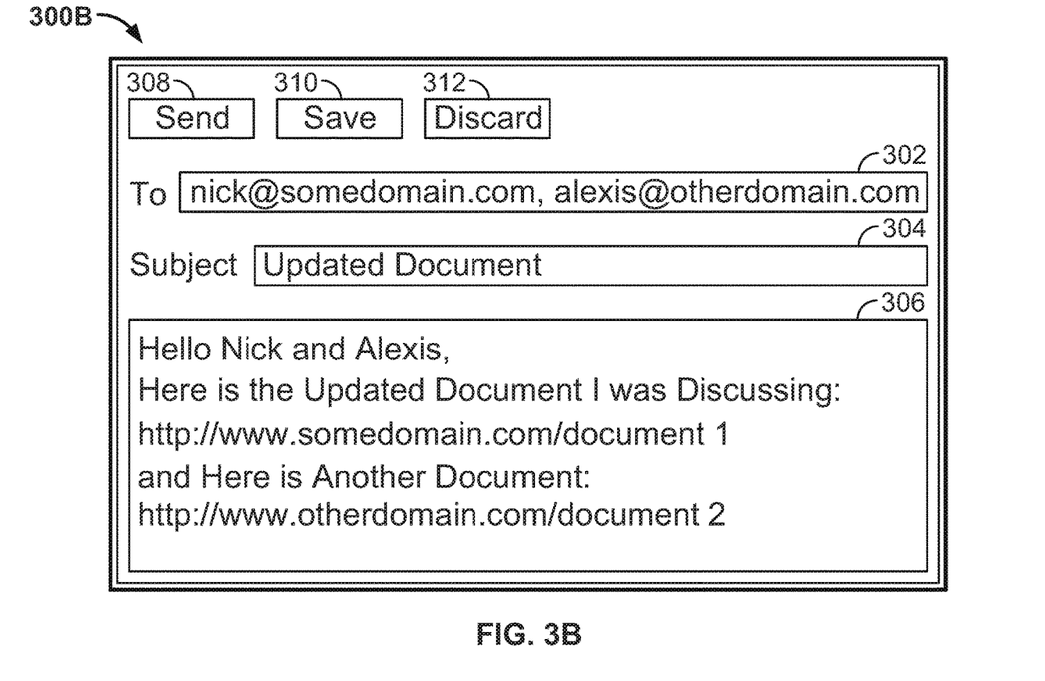

A sender may attach one or more files to an e-mail. When a file is attached and the email is sent, a copy of the file is sent to each recipient. However, a sender may also send a file stored in a cloud storage service. Instead of attaching such a file, the sender inserts a URL link into the body of the e-mail, where the link specifies the location of the file on a network either hosted by the same server that provides the e-mail service, or on a different server, or on a plurality of servers. When a recipient receives the URL and clicks on the link, the recipient is directed to the file. For example, a web browser opens a page that displays the file. FIG. 3B shows a user interface for drafting an e-mail, similar to FIG. 3A. The "To" field 302 in user interface 300B includes two e-mail addresses, nick@somedomain.com and alexis@otherdomain.com. The drafting window 306 also includes two URL links: http://www.somedomain.com/document1 and http://www.otherdomain.com/document2. These URLs are links to files stored on a cloud storage service. When a recipient clicks on a link, a web browser will direct the recipient to the file represented by the link. However, the file may be protected by an access control system. If the recipient does not have any access rights to the file, the cloud storage service will prevent the recipient from viewing or otherwise obtaining the file.

Figure 4:
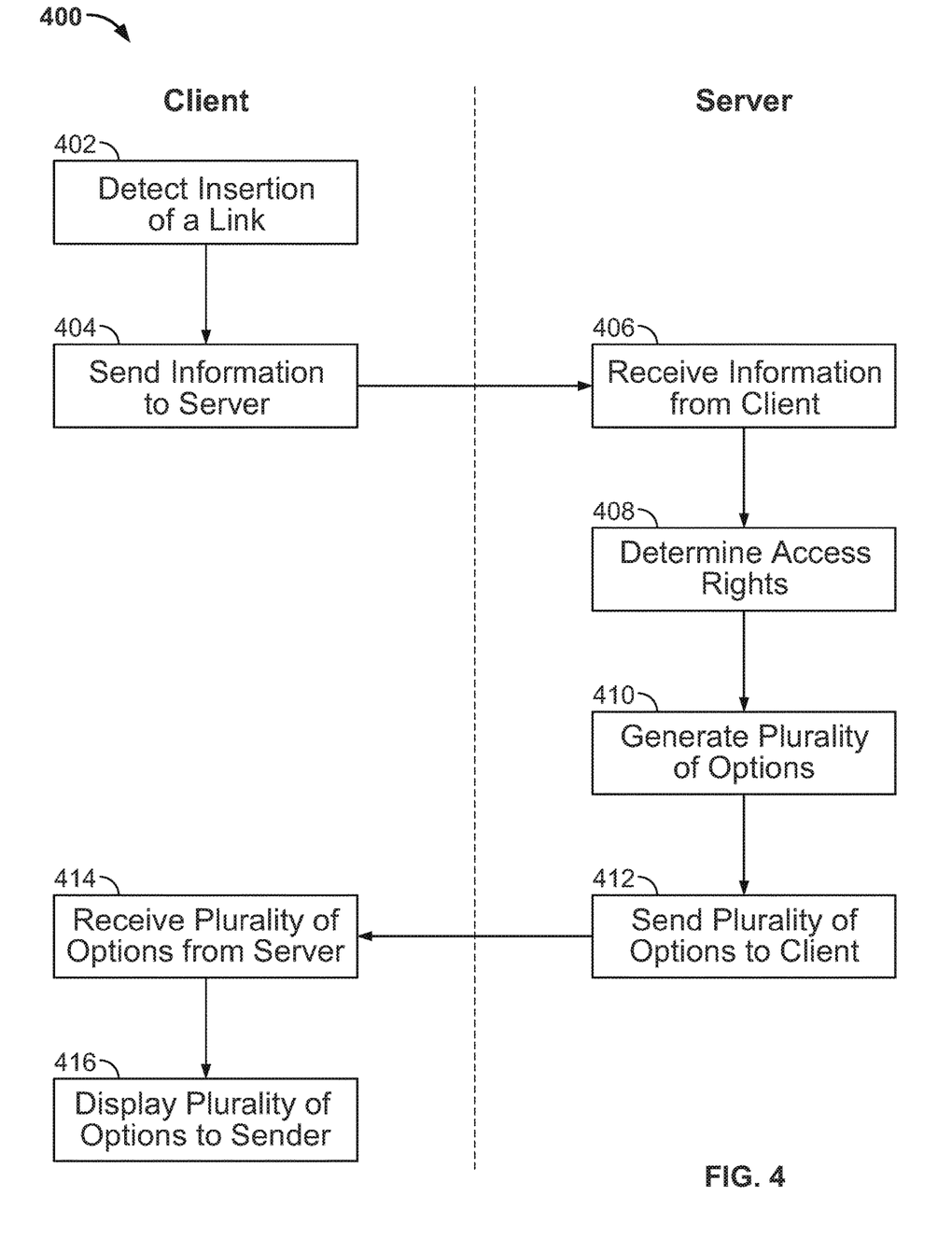
FIG. 4 shows a method for modifying access rights to electronically stored files linked in a draft electronic communication in accordance with an implementation as described herein.

In order to allow recipients to view such a file, the systems and methods described herein allow the sender to modify the access rights to the file before the electronic communication is sent. FIG. 4 shows one such exemplary method for modifying the access rights to files inserted by links into electronic communications. Method 400 may be performed in a client-server system such as illustrated in FIG. 1, where a server, or multiple servers acting in concert, provides an electronic communication service and a cloud storage service. Method 400 includes detecting the insertion of a link in an electronic communication drafted on a client device, where the link represents an electronically stored file. For example, the link may be detected using a string parser that recognizes the string pattern of a link. The client device sends information about the link, the sender of the electronic communication, and the recipients to a server. The server receives this information and determines the access rights of the sender and of each recipient to the file. The server then generates a plurality of options for the sender to modify the access rights of the recipients to the file. The plurality of options is based on the access rights to the file. For example, the plurality of options may be based on the sender's access rights to the file, the recipients' access rights to the file, or the visibility of the file. The plurality of options is sent from the server to the client device. The client device receives the plurality of options and presents them to the sender. The client device may generate additional options to modify the access rights and present them to the sender.

Method 400 begins when a sender on a client device is drafting an electronic communication, such as an e-mail, using an electronic communication service. Such services may include online e-mail providers. The draft electronic communication includes one or more recipients of the communication, as illustrated in FIG. 3B. The sender of the draft electronic communication inserts a link into the communication, like the links shown in e-mail body 306 in FIG. 3B. The link is a URL link to a file stored on a cloud storage service. In step 402, the electronic communication service running at the client device detects that the sender has inserted a link into the draft electronic communication. Generally, links to files stored in one or more servers on a cloud storage service have a particular string structure which allows the client device to parse a sequence of characters to determine if it is a link to a file. For example, the electronic communication service may recognize that the domains somedomain.com and otherdomain.com are cloud storage service domains and the links shown in FIG. 3B are standard electronic file links hosted by those domains. In another example, the links may contain file names and file extensions that indicate the link points to a file stored in a cloud storage service. In another example, the links may contain a particular string set unique to a domain that indicates it is a link to a file stored in a cloud storage service.

When the electronic communication service running on the client device detects the insertion of one or more links, the client device sends certain information to a server, as illustrated in step 404. The information sent includes information about the one or more links, such as the URL itself, or the domain that hosts the link. The information may also include information about the sender and each recipient, such as e-mail addresses. This information can be sent when the sender attempts to send the electronic communication, or when the sender inserts a link into the electronic communication. This information may also be sent periodically to the server in a pre-fetching scheme, which is discussed further in relation to step 416.

The server receives the information from the client device in step 406, where the information includes information about the links, the sender, and each recipient. In step 408, the server determines the access rights of the sender and each recipient to the files represented by the links. The server may accomplish this by first identifying the file or files that are represented by each link. Each link may be a unique URL and may correspond to a file, portion of a file, group of files, file folder, or zip file stored on a cloud storage service. The server determines the access rights of the sender and each recipient to the identified files. For example, the files may have an ACL and the server looks up whether the sender and recipients are listed as authorized individuals on the ACL or are members of an authorized group or domain. The ACL may store the e-mail addresses of authorized individuals and their associated role, and the server uses the email addresses of the sender and recipients received from the client device to determine their access rights.

After the server determines the access rights of the sender and recipients to the files represented by the links, it may be that one or more recipients do not have any access rights to one or more files. If that is the case, the server generates a plurality of options to modify the access rights to those files so that the recipients can access them, illustrated as step 410. The options may include adding the recipients to the ACL as authorized individuals, or changing the visibility of the file (e.g. making it publicly available so that everyone who uses the link can access the file). The options available to the sender may be based on the access rights to the files. For example, if the sender is an administrator or owner of a file, then the sender can add recipients to the ACL and specify their role, or can change the visibility of the file. However, if the sender is not allowed to view or edit the ACL, or may only view a portion of the ACL, the sender's ability to modify access rights is limited. If the file is stored in a closed domain (e.g. somedomain.com) and the sender is not part of that domain, the sender may be able to add recipients to the ACL and specify their role but cannot change the visibility of the file. If the sender only has read access to the file, or no access to the file, then the sender will not be able to modify the access rights for that file. Other restrictions may apply to the sender's ability to modify the access rights for the files, such as restrictions on the role that the sender may assign to individuals or restrictions placed on the file by the domain in which the file is located. The server may work in conjunction with the client device to generate the plurality of options, as described below.

Once the server generates a plurality of options for modifying the access rights to the files represented by the links, the server sends information about the plurality of options to the client device, shown as step 412. The server may send additional information to the client device, such as the domain of the files, senders, and recipients. The client device receives this information in step 414. If all the recipients of the draft electronic communication have access to the files, the information sent may simply be a confirmation that there are no access rights problems and no options to modify the access rights to the file are sent or displayed to the sender. The client device may also generate additional options for the sender to modify the access rights to the file in step 414. For example, the client device may generate options based on the visibility of the file or the domain or the file as compared to the domain of the recipients, while the server may generate options based on the sender's access rights to the device.

Once the client device receives the plurality of options from the server and generates additional options, the client device presents the plurality of options to the sender, illustrated as step 416. The electronic communication service running on the client device may present a notification window, pop-up window, status bar notification within a browser, Javascript notification, a separate web page, icon, sound, or other user interface or notification that informs the sender that not all recipients currently have access to the files included in the draft electronic communication. The notification window also presents the sender with the plurality of options for the sender to modify the access rights to the files. The notification window may also include warning or messages if the sender's ability to modify the access rights to the files is limited.

Method 400 may be accomplished in a pre-fetching scheme, where the generation of the plurality of options is completed periodically but is not presented to the sender until the sender attempts to send the electronic communication. For example, steps 402 through 414 are completed periodically, or any time a recipient or link is added or removed from the electronic communication. Periodically may mean once every minute, once every five minutes, or any other suitable regular interval of time. The client device may send information to the server only regarding the new recipients or inserted links, or may send information regarding all recipients and inserted links. However, step 416 is only processed once, when the sender attempts to send the electronic communication. The client device determines if the plurality of options is based on the current draft of the electronic communication, or was based on information from an earlier draft. If the information is current, the client device presents the plurality of options, and if the information is out-of-date method 400 can be performed again. Step 416 may be performed even when the client device has not received all the information from the server yet—the display may update as new information arrives. In this manner, the sender is notified more quickly that there are access rights problems, rather than waiting for the server to determine if there are any access rights problems at the time the sender clicks on the send button.

Thus in the manner described above, method 400 presents a sender of a draft electronic communication with a plurality of options to modify the access rights to files represented by links that are inserted in the draft electronic communication. This allows the sender to fix any access rights problems that may exist, or at least make the sender aware of such problems. The client device and the server may use a specific network protocol to exchange information while performing method 400.

Figure 5:
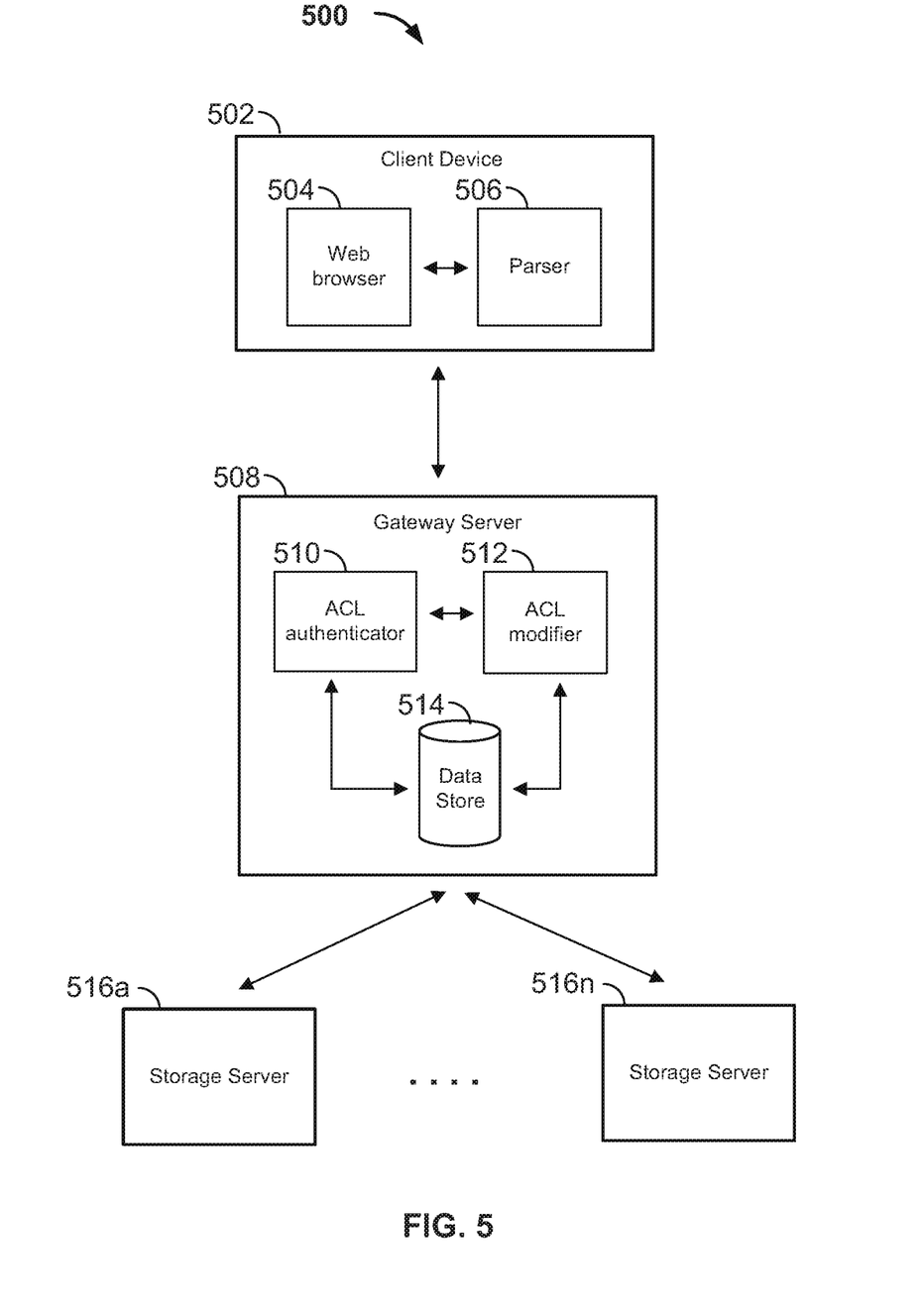
FIG. 5 shows a client-server system for modifying access rights to electronically stored files linked in a draft electronic communication in accordance with an implementation as described herein.

Method 400 may be performed in a client-server system, where the server provides an electronic communication service and a cloud storage service. An example of a client-server system that may perform method 400 is shown in FIG. 5. System 500 includes a client device 502, gateway server 508, and storage servers 516*a* through 516*n*. Client device 502 may be a desktop computer, laptop computer, handheld device, or any other electronic device. Client device 502 includes a web browser 504 for displaying web pages and information represented by URL links. Web browser 504 may display a drafting interface for an online electronic communication service. Client device 502 also includes a parser 506 for parsing URL links inserted into draft electronic communications. The parser may be an extension of web browser 504, or may be downloaded to the client device by the electronic communication service, or may be a local script or program stored on the client device. Parser 506 parses links inserted into electronic communications and determines if the link represents a file stored on a cloud storage service.

Gateway server 508 in system 500 provides an electronic communication service and a cloud storage service. Gateway server includes an ACL authenticator 510, ACL modifier 512, and data store 514. Data store 514 stores, among other things, files stored in the cloud storage services and communications stored by the electronic communication service. Gateway server 508 may communicate with other storage servers 516*a* through 516*n*, which collectively provide data storage for files in the cloud storage service and communications stored by the electronic communications service. The files stored in data store 514 and storage servers 516a through 516n may have ACLs associated with them can control the access rights to the files.

ACL authenticator 510 in gateway server 508 receives requests from client device 502 to check whether an individual has access rights to a file stored in data store 514 or storage servers 516a through 516n. For example, ACL authenticator 510 may receive a URL link to a file stored in data store 514 and an e-mail address of an individual. The ACL authenticator identifies the file represented by the link and compares the ACL of the file with the e-mail address to determine if the individual is authorized to access the file. ACL authenticator 510 returns the result of the inquiry to the client device. ACL authenticator 510 may also generate a plurality of options for the requester to modify the access rights of the file. ACL modifier 512 in gateway server 508 receives requests from client device 502 to modify the access rights to files stored in data store 514 or storage servers 516a through 516n. ACL modifier 512 determines if the requester is authorized to modify the access rights of the file before modifying it. ACL modifier 512 may communicate with ACL authenticator 510 to determine if the requester is authorized to modify the ACL of the file. If so, ACL modifier edits the ACL of the file, by for example adding or removing individuals or groups from the list or changing the role of an authorized individual or group. Thus system 500 provides hardware for modifying access rights to electronically stored files linked in a draft electronic communication stored at a client device.

Figure 6A:
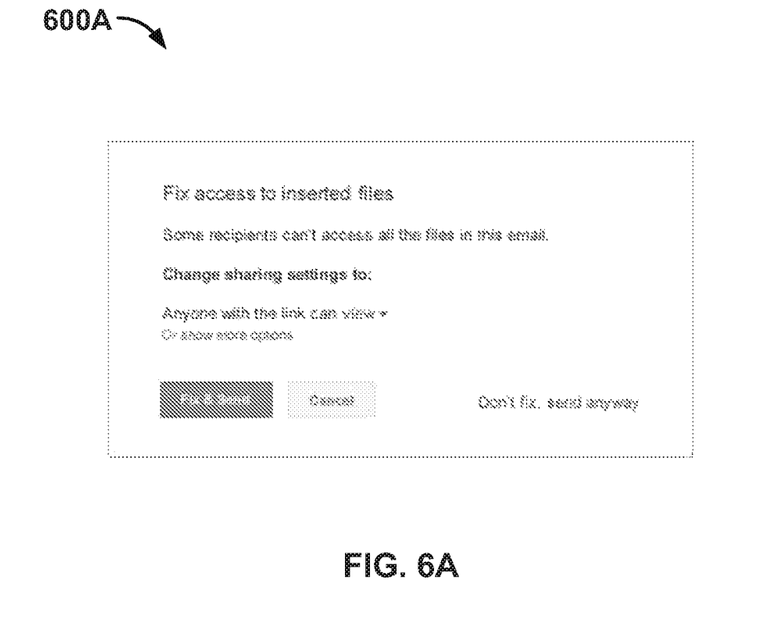
FIGS. 6A and 6B show sample screen shots of a user interface for modifying access rights to electronically stored files linked in a draft electronic communication in accordance with an implementation as described herein.

When a server sends a plurality of options to modify access rights to the client device, the electronics communications service provides a display or user interface for the sender to select from among a number of options to modify the access rights. The options are determined by a server hosting the electronic communications service and cloud storage service. This display may be in the form of a notification window or pop-up window that appears during the drafting of an electronic communication. Such notification may be provided within the same browser and, in some cases, within the same frame as the electronic communication. For example, a notification window may appear when a sender attempts to send the e-mail or when a link is inserted in the e-mail. FIG. 6A shows a sample notification window 600A that may appear when a sender of an e-mail attempts to send a link to an electronically stored file. Notification window 600A notifies the sender that one or more recipients cannot access all the files in the e-mail, and also provides a number of options for the sender to modify the access rights. For example, notification window 600A offers the sender the option to allow anyone with the link to view the file (i.e. change the file's visibility to public). The sender may also be able to change the role of the public from "view" to other options like "edit" (not shown in the figure). The sender may also choose to proceed without modifying the access rights or cancel the notification window and return to the drafting window.

Figure 6B:
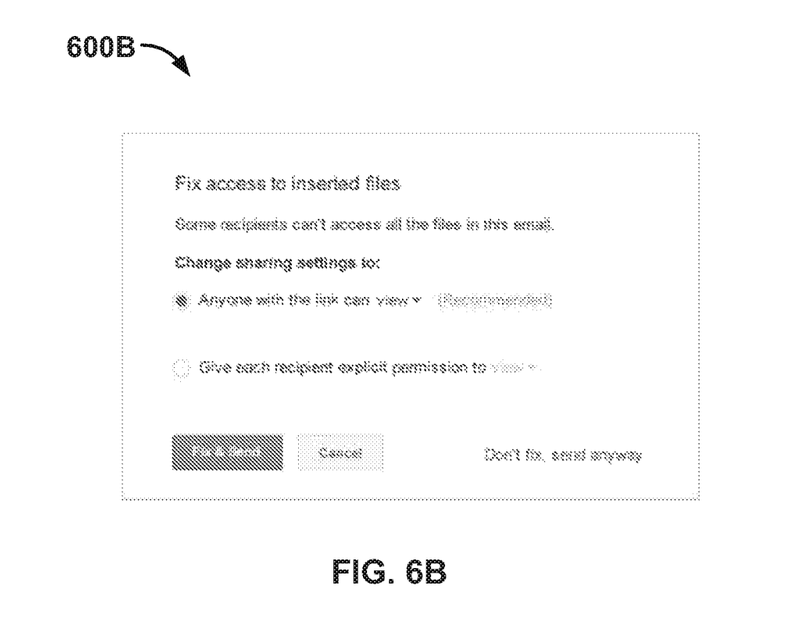

Notification window 600A may also provide additional options that are initially hidden from view. Certain preferred options may be displayed immediately, and the sender has the option to view additional options. When a sender selects "show more options," the notification window shows additional options to modify access rights to the file. Notification window 600B in FIG. 6B shows the notification window after a sender has selected "show more options." An additional option appears to give each recipient explicit permission to view (or another role of the sender's choosing) the file. If the sender selects this option, each recipient will be added to the ACL of the file and given the role specified by the sender.

Figure 7:
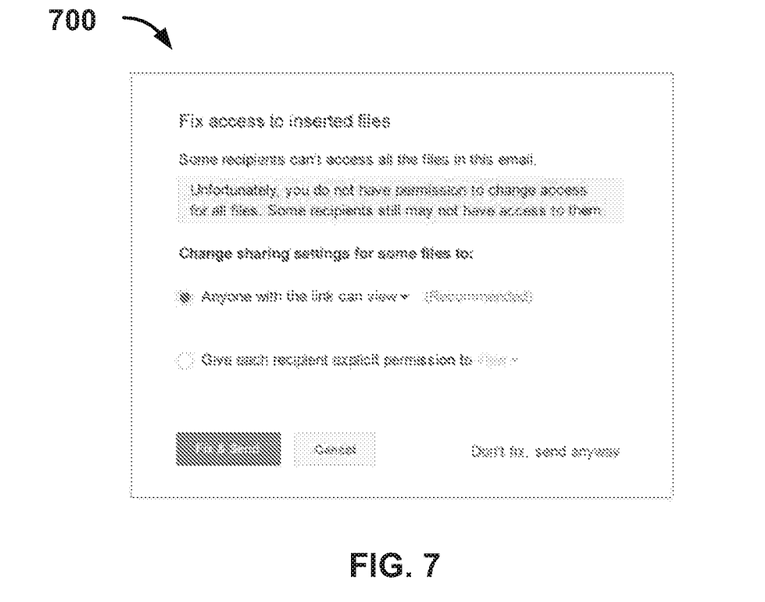
FIGS. 7 through 9 show additional sample screen shots of a user interface for modifying access rights to electronically stored files linked in a draft electronic communication accordance with an implementation as described herein.

FIGS. 6A and 6B show examples of a notification window for modifying access rights to a file when the sender is allowed to change the access rights to all the files inserted into the draft electronic communication (e.g. the sender is the owner of the files). However, the options available to the sender depend on the access rights to the files. For example, if the sender only has read access to a file the sender does not have the right to modify the access rights of the file. When this is the case, the notification window may contain additional warnings. Notification window 700, shown in FIG. 7, is similar to notification window 600B except that an additional warning appears that the sender does not have permission to change access for all the files in the e-mail. Notification window 700 still offers a number of options to modify the access rights of the files that the sender is allowed to modify, but selecting an option will not alter the access rights of files that the sender is not allowed to modify.

Figure 8:
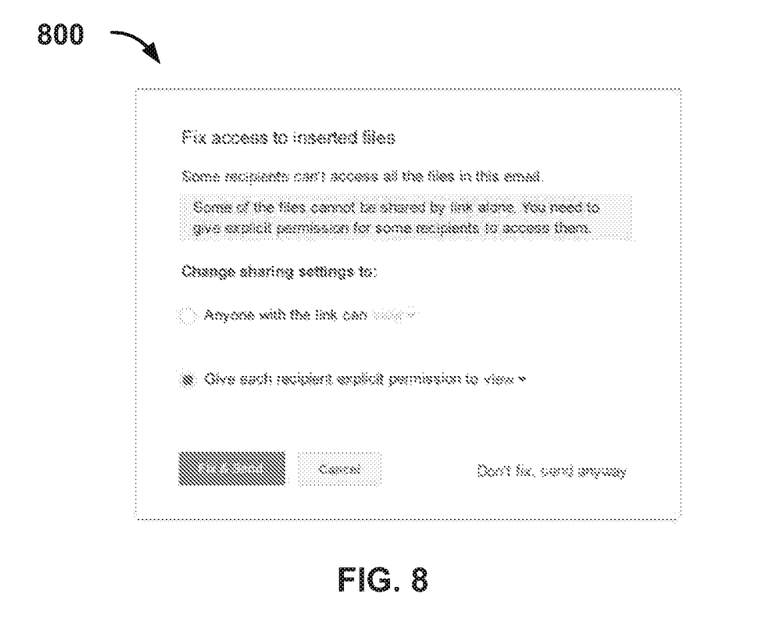

In certain embodiments, the sender may be limited in how they can modify the access rights to a file inserted via link in an electronic communication. For example, if a file is stored on a closed or non-public domain and the sender does not belong to that domain, the sender may not be able to change the visibility of the file so that it may be accessed by individuals outside the domain. For example, if the file is stored in the private domain somedomain.com and the sender is not a member of this domain, the sender cannot change the file's visibility so that people outside of somedomain.com can view it. In this case, the sender may only explicitly add the recipients to the file's ACL. Notification window 800, shown in FIG. 8, illustrates this scenario. Notification window 800 is similar to notification window 600B but an additional warning is displayed stating that some of the files cannot be shared by link alone, but each recipient must be given explicit permission to access the file. The sender still has the choice to modify the access rights to the files either by granting access to anyone with the link (e.g. changing the visibility of the file to public) or by giving each recipient explicit permission to access the files. If the sender chooses to change the visibility of the files, the server will change the visibility of any files in which the visibility can be changed, but will not modify the visibility of any files for which such a change is not allowed.

Figure 9:
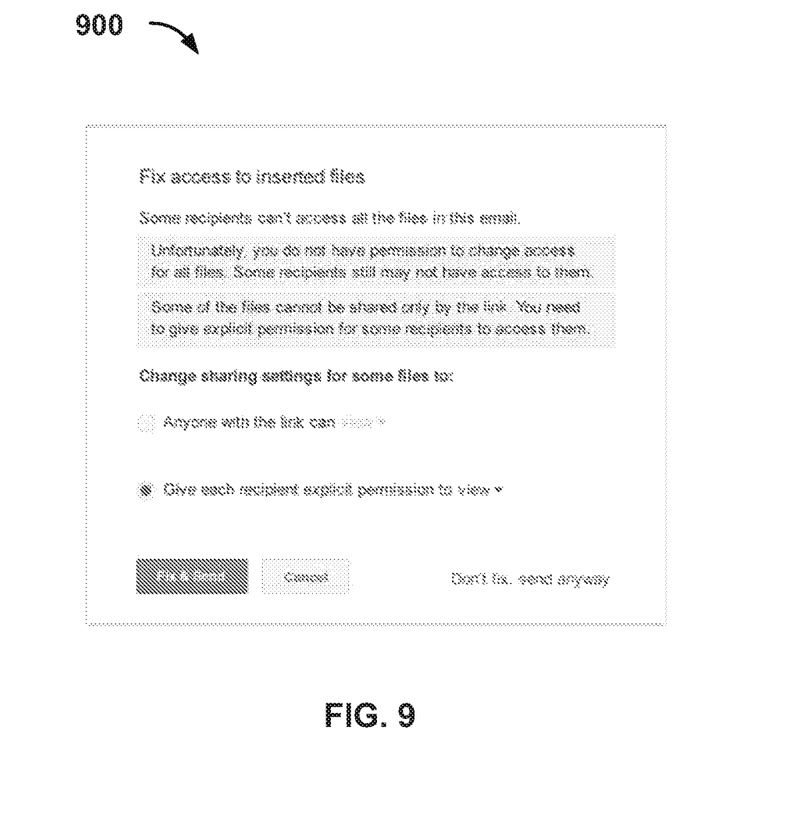

In some cases, the sender may not be allowed to change the access rights to some files inserted into an electronic communication, and also may not be able to modify the access rights to other files by changing the visibility of the file. For example, this situation may occur when the sender inserts a link to a file of which the sender only has read access, and inserts another link to a file that belongs to a specific domain and the sender does not belong to that domain. This situation is a combination of the access rights problems discussed in relation to FIGS. 7 and 8. Notification window 900, shown in FIG. 9, illustrates the warnings given to the sender in this case. Notification window 900 is similar to notification window 600B, but includes two additional warnings. One warning notifies the sender that he or she does not have permission to change the access rights for all files in the e-mail, like the warning appearing in FIG. 7. Another warning notifies the sender that some of the files cannot be shared by link alone but rather each recipient must be given explicit permission, like the warning appearing in FIG. 8. The sender is again given a number of options for modifying the access rights to the files, but the warnings advise the sender that certain recipients will still have problems accessing the file.

The notification window presented to a sender of an electronic communication when a link to a file is inserted is not limited to the notification windows shown in FIGS. 6A through 9. The layout, appearance, wording, the number of options available to the sender, and when the notification window appears may be selected as desired. For example, the notification window may list each recipient and give the sender options to modify the access rights for each recipient. The notification window may list each file linked in the draft electronic communication and give the sender options to modify the access rights for each file individually. The notification window may appear when a sender attempts to send the electronic communication, or it may appear when a link is inserted. The notification may take the form of an inline warning or other display rather than a window. The notification window may include a link to a web page with more detailed options to modify the access rights of the files. The notification window may include images or diagrams to assist the sender in modifying the access rights. The notification window may appear when drafting an original electronic communication, or may also appear when replying to or forwarding an electronic communication. The notification window may appear only when there are access right problems to the files linked into the electronic communication, or only when there are access right problems that are at least partially fixable. The notification window may not appear if all recipients have access to the files.

It will be apparent to one of ordinary skill in the art that aspects of the systems and methods described herein may be implemented in many different forms of software, firmware, and hardware in the implementations illustrated in the figures. The actual software code or specialized control hardware used to implement aspects consistent with the principles of the systems and method described herein is not limiting. Thus, the operation and behavior of the aspects of the systems and methods were described without reference to the specific software code—it being understood that one of ordinary skill in the art would be able to design software and control hardware to implement the aspects based on the description herein.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

What is claimed is:

1. A system comprising:
a memory; and
a processor, coupled to the memory, to:
provide a drafting area of a user interface for a sender to compose an electronic communication and a field area of the user interface to receive user input that identifies a recipient of the electronic communication;
receive, in the drafting area of the user interface to compose the electronic communication, a user input of a resource locator of a file stored at a server of a cloud storage service that is accessible via an Internet; and
responsive to receiving, in the drafting area of the user interface, the user input of the resource locator of the file stored at the server of the cloud storage service, present, in the user interface, a notification area that identifies, for the sender, a plurality of options to modify access rights of the recipient for the file stored at the server of the cloud storage service that is accessible via the Internet and identified in the drafting area of the user interface, wherein the plurality of options to modify the access rights of the recipient to the file identified in the drafting area of the user interface is based on access rights of the sender.

2. The system of claim 1, the processor further to:
parse the drafting area of the user interface to identify the resource locator of the file that are stored on the server.

3. The system of claim 1, the processor further to:
present, in the user interface, a selection area that presents a first option from the plurality of options for selection by the sender.

4. The system of claim 3, the processor further to:
present, in the user interface, a warning area of the user interface that indicates that the recipient does not have the access rights to the file.

5. The system of claim 4, wherein the warning area indicates that the first option selected by the sender exceeds the access rights of the sender.

6. The system of claim 1, the processor further to:
receive a user selection of a first option of the plurality of options, the user selection of the first option to cause a modification of the access rights of the recipient to the file based on the access rights of the sender.

7. The system of claim 1, wherein the field area of the user interface identifies a plurality of recipients of the electronic communication, wherein the file is associated with an access control list, and wherein the notification area identifies the plurality of recipients and access rights of the plurality of recipients to the file.

8. The system of claim 7, wherein the notification area comprises an icon indicative of the access rights of each of the plurality of recipients to the file.

9. The system of claim 7, the processor further to:
receive a user selection of a first option of the plurality of options to modify the access rights of one or more of the plurality of recipients.

10. The system of claim 9, wherein a warning area of the user interface indicates that the modification of the access rights for at least one recipient of the one or more of the plurality recipients is not to be fulfilled.

11. The system of claim 10, wherein the warning area indicates that the access rights of the at least one recipient is changed by adding the at least one recipient to the access control list associated with the file.

12. A method comprising:
providing, by a processor of a client device, a drafting area of a user interface for a sender to compose an electronic communication and a field area of the user interface to receive user input that identifies a recipient of the electronic communication;
receiving, in drafting are of the user interface to compose the electronic communication, a user input of a resource locator of a file stored at a server of a cloud storage service that is accessible via an Internet; and
responsive to receiving, in the drafting area of the user interface, the user input of the resource locator of the file stored at the server of the cloud storage service, presenting, in the user interface associated with the client device, a notification area that identifies, for the sender, a plurality of options to modify access rights of the recipient for the file stored at the server of the cloud storage service that is accessible via the Internet and identified in the drafting area of the user interface, wherein the plurality of options to modify the access rights of the recipient to the file identified in the drafting area of the user interface is based on access rights of the sender.

13. The method of claim 12, further comprising:
parsing the drafting area of the user interface to identify the resource locator of the file that are stored on the server.

14. The method of claim 12, further comprising:
presenting, in the user interface, a selection area that presents a first option from the plurality of options for selection by the sender.

15. The method of claim 14, further comprising:
presenting, in the user interface, a warning area that indicates that the recipient does not have the access rights to the file, wherein the warning area indicates that the first option selected by the sender exceeds the access rights of the sender.

16. A non-transitory computer-readable medium comprising instructions that, responsive to execution by a processor, cause the processor to:
provide, by the processor, a drafting area of a user interface for a sender to compose an electronic communication and a field area of the user interface to receive user input that identifies a recipient of the electronic communication;
receive, in the drafting area of the user interface to compose the electronic communication, a user input of a resource locator of a file stored at a server of a cloud storage service that is accessible via an Internet; and
responsive to receiving, in the drafting area of the user interface, the user input of the resource locator of the file stored at the server of the cloud storage service, present, in the user interface, a notification area that identifies, for the sender, a plurality of options to modify access rights of the recipient for the file stored at the server of the cloud storage service that is accessible via the Internet and identified in the drafting area of the user interface, wherein the plurality of options to modify the access rights of the recipient to the file identified in the drafting area of the user interface is based on access rights of the sender.

17. The non-transitory computer-readable medium of claim 16, the processor further to:
present, in the user interface, a selection area that presents a first option from the plurality of options for selection by the sender.

18. The non-transitory computer-readable medium of claim 16, the processor further to:
present, in the user interface, a warning area that indicates that the recipient does not have the access rights to the file.

19. The non-transitory computer-readable medium of claim 16, the processor further to:
receive a user selection of a first option of the plurality of options, the user selection of the first option to cause a modification of the access rights of the recipient to the file based on the access rights of the sender.

20. The method of claim 14, further comprising:
receiving a user selection of a first option of the plurality of options, the user selection of the first option to cause a modification of the access rights of the recipient to the file based on the access rights of the sender.

* * * * *